United States Patent
Duncan et al.

(10) Patent No.: US 6,640,661 B2
(45) Date of Patent: Nov. 4, 2003

(54) TILT STEERING WHEEL

(75) Inventors: Scott Duncan, Troy, MI (US); Richard D Zielesch, Jr., Grand Blanc, MI (US); Glenn F Syrowik, Ortonville, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 49 days.

(21) Appl. No.: 10/005,236

(22) Filed: Dec. 5, 2001

(65) Prior Publication Data

US 2003/0101839 A1 Jun. 5, 2003

(51) Int. Cl.$^7$ ................................................. B62D 1/18
(52) U.S. Cl. ........................................ 74/493; 280/775
(58) Field of Search ..................... 74/493, 527, 530; 280/775

(56) References Cited

U.S. PATENT DOCUMENTS

| | | | |
|---|---|---|---|
| 4,244,236 A | 1/1981 | Sylvester ..................... 74/493 |
| 4,633,732 A | * 1/1987 | Nishikawa et al. ............ 74/493 |
| 4,967,618 A | * 11/1990 | Matsumoto et al. .......... 74/493 |
| 5,029,489 A | * 7/1991 | Burmeister et al. ........... 74/493 |
| 5,426,994 A | 6/1995 | Khalifa et al. ................. 74/493 |
| 5,461,937 A | 10/1995 | Cymbal ......................... 74/493 |
| 5,527,068 A | 6/1996 | Schneider ..................... 280/775 |
| 5,555,772 A | 9/1996 | Schneider ...................... 74/493 |
| 5,687,990 A | 11/1997 | Uphaus ......................... 280/775 |
| 5,848,557 A | * 12/1998 | Sugiki et al. .................. 74/493 |
| 5,911,789 A | * 6/1999 | Keipert et al. ................. 74/493 |
| 6,167,777 B1 | 1/2001 | Snell ............................. 74/493 |

* cited by examiner

Primary Examiner—David Fenstermacher
Assistant Examiner—Bradey J. Van Pelt
(74) Attorney, Agent, or Firm—Donald J. Wallace

(57) ABSTRACT

A tilt steering wheel in a vehicle is provided which can be locked in selected positions by a mechanism that includes a rod having pivot connections with stationary and movable components of the steering column. A rotatable locking sleeve encircles the rod to form a rigid connection between the rod and one of the pivot connections. Mesh teeth on the rod and sleeve prevent the sleeve from moving in the elongated direction. By rotating the sleeve on the rod it is possible to shift the teeth out of mesh such that the rod can move longitudinally to set the steering column in a selected position. The sleeve has a slot with major and minor portions and in the locking position the minor portion captures a pivot shaft of the steering column and prevents relative movement of the rod with respect to the pivot shaft.

6 Claims, 5 Drawing Sheets

TILT STEERING WHEEL

BACKGROUND OF THE INVENTION

The present invention relates to tiltable steering column assemblies for automotive vehicles, and particularly to a lock mechanism for retaining the tilting component of the steering column in selected positions of adjustment while minimizing any lash in a steering wheel connected to the steering column.

DESCRIPTION OF THE PRIOR DEVELOPMENTS

Vehicle steering columns are often provided with a tiltable component that enables the steering wheel to be set at varying degrees of tilt, according to the desires and needs of different persons that might have occasion to drive the vehicle. Typically a manually operable lock mechanism is provided for retaining the steering wheel component in selected positions of tilt adjustment.

Representative lock mechanisms for tiltable steering columns are shown in U.S. Pat. No. 5,282,394, Dominique, et al., U.S. Pat. No. 4,463,626, Kazaoka, et al., and U.S. Pat. No. 5,222,410, Kinoshita. An advancement to the aforementioned patents is brought forth in U.S. Pat. No. 6,167,777, Snell.

The positional or tilt lock mechanism is designed to have high strength and ruggedness, while being relatively small and compact for ready installation in different size vehicles. In Snell, the positional lock mechanism has a modular construction, whereby it can be used in different types of vehicles. A special feature of the Snell lock mechanism is the use of an elongated rod between upper and lower steering column components, in combination with a locking sleeve that encircles the rod to retain the rod in selected positions of adjustment. The rod and the sleeve form an adjustable link. The sleeve is pivotally connected with the lower portion of the steering column. The rod is pivotally connected with an upper portion of the steering column. The elongation of the combination of the rod and the sleeve sets the adjustable tilt between the upper and lower portions of the steering column. The rod and sleeve have mating teeth that are discontinuous in the circumferential plane, whereby the sleeve can be rotated around the rod axis to move the teeth into or out of mesh.

The sleeve grips the external surface of the rod, such that when the teeth are in mesh, the teeth are precluded from separation, even under high impact accident conditions when high forces might be imposed on the steering column components.

One problem that may occur when the steering column is in a locked position, is lash, a state of movement in the steering wheel and column, as opposed to a solid, steady state. Lash can occur due to machine tolerances when manufacturing the specific components of the system. In premium motor vehicles it is desirable that all components have a solid feeling and that vibration or looseness of components be held to a minimum. Accordingly, it is desirable that the steering wheel conveys this solid feeling to the operator. The present invention provides a tilt adjustable steering column that eliminates or sharply reduces possible instances of lash.

SUMMARY OF THE INVENTION

The present invention provides in a preferred embodiment an articulated tiltable steering column comprising an upper steering wheel column member, a lower stationary steering column member, and a pivot connection between the upper and lower column members, whereby a steering wheel can be tiltably adjusted around the pivot connection to selected positions.

The steering column further comprises a locking mechanism for retaining the column members in selected positions. The locking mechanism is comprised of an externally threaded rod retained between the column members, and an internally threaded sleeve encircling the rod. The rod has a longitudinal axis, and has a first pivot connecting the rod to one of the column members, and a second pivot connecting the rod to the other column member. The second pivot is comprised of a pivot shaft carried by the other column member and an axial slot in the rod slidable on the pivot shaft.

The sleeve has two circumferential slots embracing the pivot shaft. The rod is comprised of a first set of circumferentially discontinuous external teeth. The sleeve is comprised of a second set of circumferentially discontinuous internal teeth. The sleeve internal teeth are in mesh with the rod external teeth when the sleeve is rotated in one direction, and the internal teeth are out of mesh with the external teeth when the sleeve is rotated in the opposite direction. The sleeve further has a tolerance cap connected thereto. The tolerance cap has a contact surface to engage the shaft and prevent relative movement of the rod with respect to the pivot shaft when the rod and the sleeve are meshed with one another.

It is a feature of the present invention to provide a tilt adjustable steering column assembly for an automotive vehicle that has minimized lash in the positional locking mechanism.

Other features of the invention will be more apparent to those skilled in the art from a review of the invention from the accompanying drawings and detailed description.

DETAILED DESCRIPTION OF THE INVENTION

Figure 1:
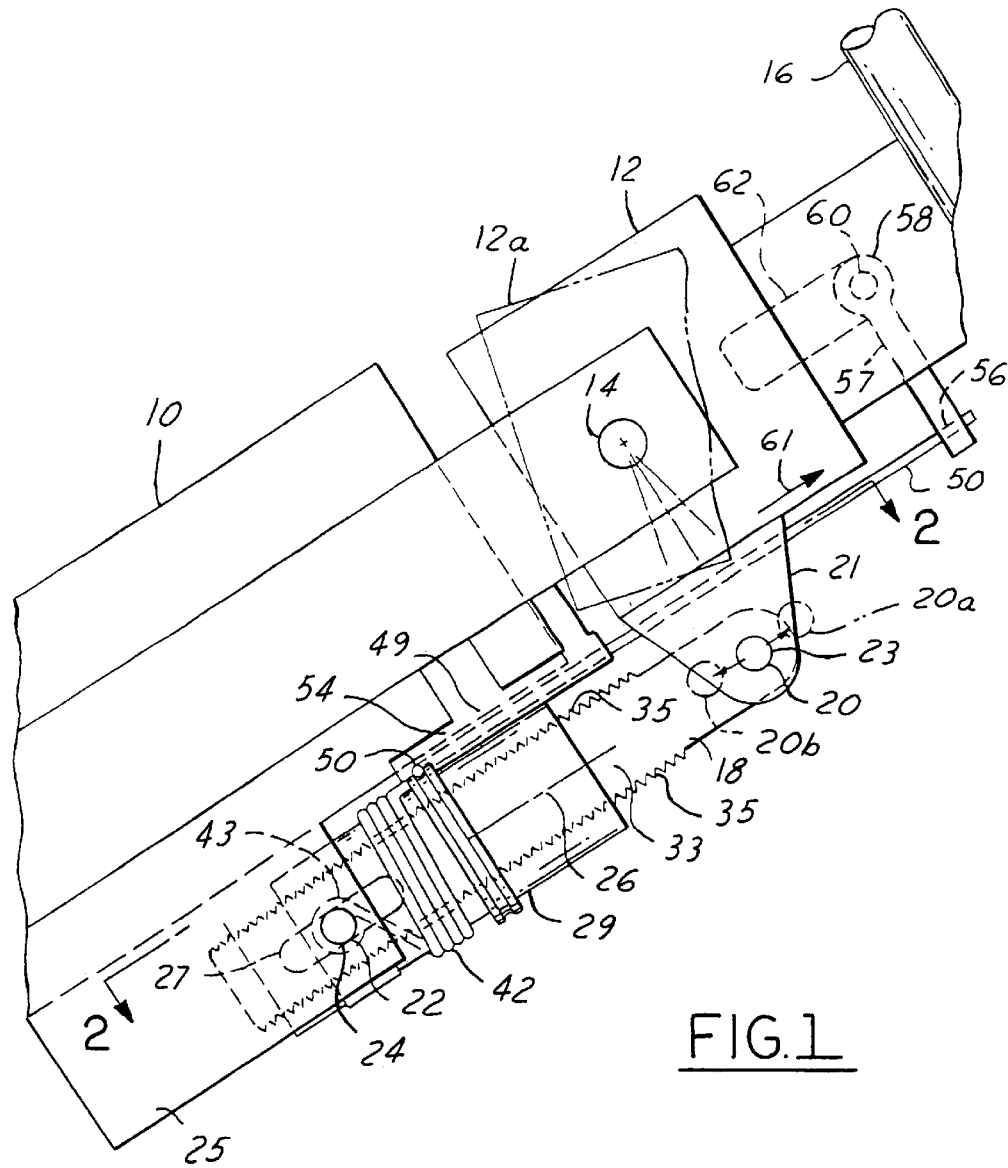
FIG. 1 is a fragmentary side elevational view of a vehicle steering column having a positional lock mechanism including a rod and sleeve installed thereon.

FIG. 1 presents a vehicle steering column assembly that includes a lower stationary column member 10 and an upper tiltable steering column member 12 connected together by a pivot connection 14, whereby column member 12 is capable of tilting adjustment around the pivot connection axis. A steering wheel 16 is located at the upper end of column member 12.

The interior spaces within column members 10 and 12 are occupied by rotary shafts that are connected by a universal joint centered on the axis of pivot connection 14. Steering wheel 16 is attached to the shaft located within column member 12.

A locking mechanism is provided for retaining column member 12 in selected positions of tilt adjustment. In FIG. 1, dashed lines show the downward limit of tilt adjustment for column member 12. Column member 12 can be tilted upwardly from the full line position to a similar extent. Typically, column member 12 can be tiltably adjusted downwardly from its full line position by approximately thirteen degrees, and upwardly from its full line position by a similar number of degrees.

The locking mechanism for retaining column member 12 in selected positions of tilt adjustment (up or down) comprises an externally threaded rod 18 having a first pivot connection 20 to column member 12 and a second pivot connection 22 to column member 10. By adjusting the location of the pivot connection 22 on the longitudinal axis 26 of rod 18 it is possible to vary the effective length of the rod and the tilt angle of column member 12 around the axis of pivot connection 14.

Figure 2:
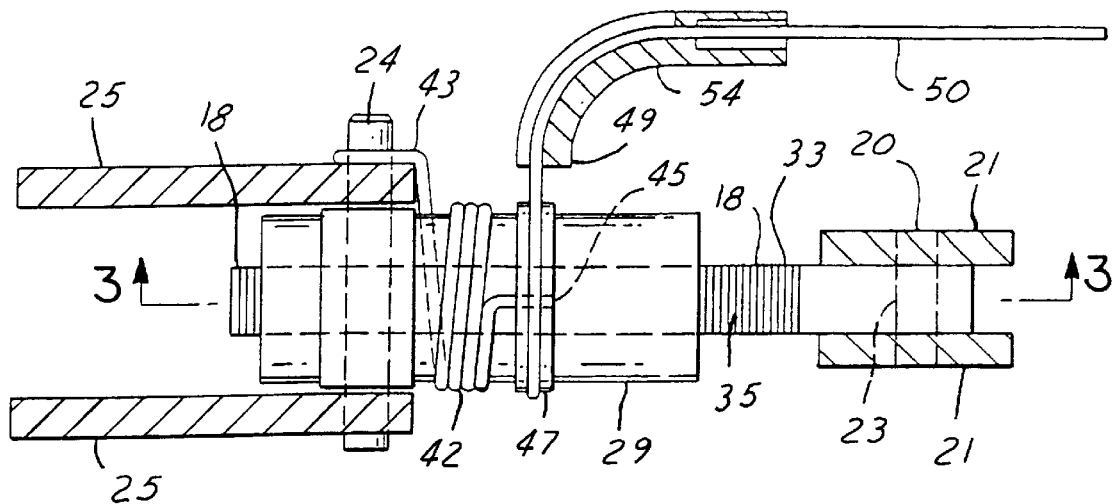
FIG. 2 is a fragmentary sectional view taken on line 2—2 in FIG. 1.
Figure 3:
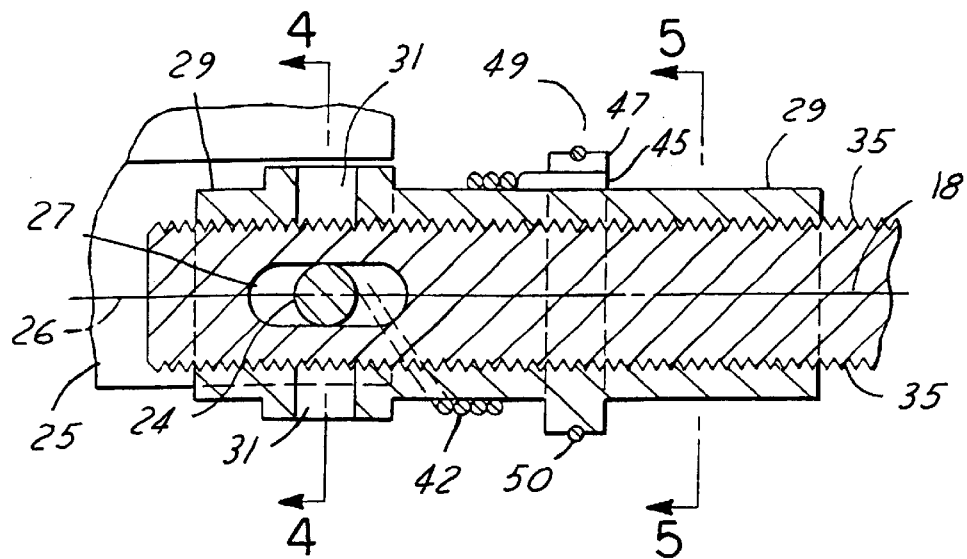
FIG. 3 is a sectional view taken on line 3—3 in FIG. 2.

Turning additionally to FIGS. 2–3, pivot connection 20 comprises two parallel ears 21 extending downwardly from column member 12, and a pivot shaft 23 extending transversely through ears 21 and the upper end of rod 18. Pivot connection 22 comprises a pivot shaft 24 extending between two parallel ears 25 depending from column member 10. Pivot connection 22 further includes an axial slot 27 formed in rod 18, such that shaft 24 extends transversely through the slot. Rod 18 can rotate on shaft 24 and also slide longitudinally on the shaft, to vary the effective length of the rod, i.e. the distance between pivot connections 20, 22.

Figure 4:
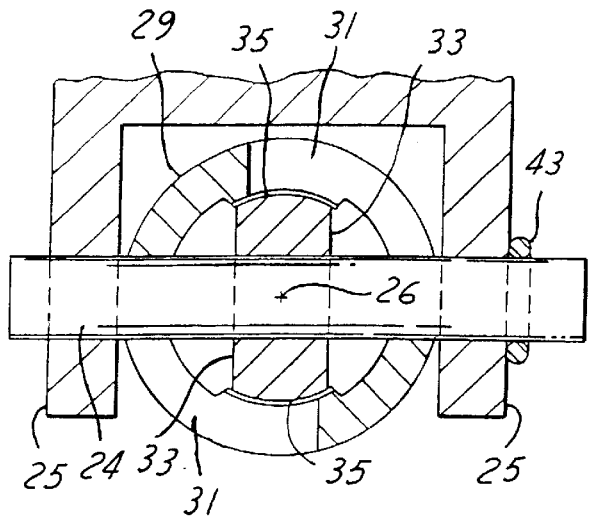
FIG. 4 is a transverse sectional view taken on line 4—4 in FIG. 3.
Figure 5:
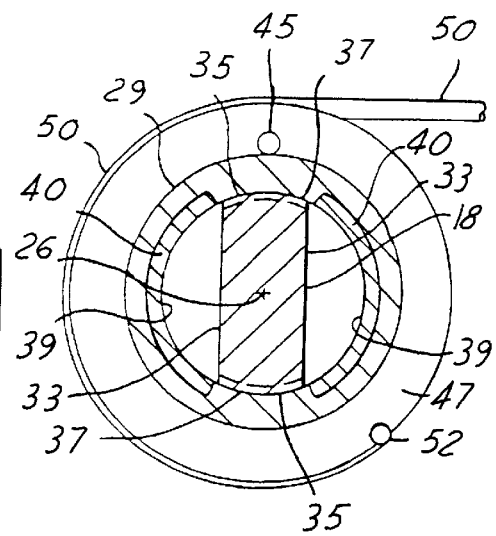
FIG. 5 is a transverse sectional view taken on line 5—5 in FIG. 3.
Figure 6:
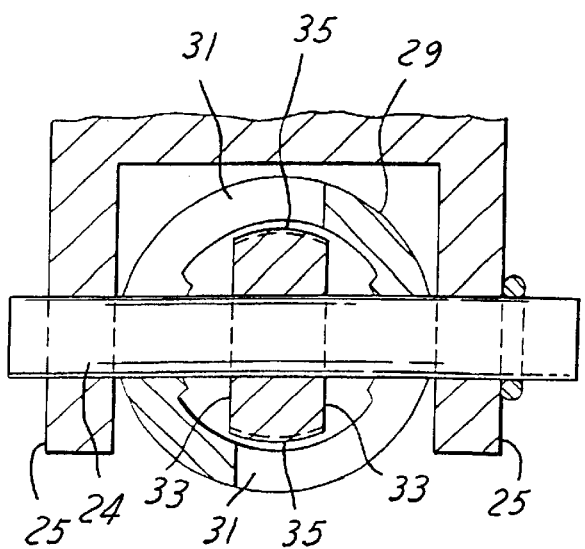
FIG. 6 is a sectional view taken in the same direction as FIG. 4, but showing lock components in a different position of adjustment.

Rod 18 is longitudinally stabilized on shaft 24 by means of a sleeve 29 that encircles the rod. The sleeve has two arcuate circumferential slots 31 embracing shaft 24, whereby the sleeve can be rotated on rod 18 a limited distance around rod axis 26. In the illustrated apparatus, slots 31 permit sleeve 29 to rotate approximately ninety degrees around rod axis 26 (FIG. 5). FIG. 4 shows sleeve 29 at one limit of the sleeve rotational movement. FIG. 6 shows sleeve 29 at the other limit of the rotational movement.

Rod 18 has two parallel flat side surfaces 33 extending the full length of the rod, and two arcuate serrated surfaces 35 connecting flat surfaces 33. The serrations form diametrically opposed external teeth on the rod. The arcuate serrated surfaces 35 are centered on rod axis 26.

Sleeve 29 has two internal arcuate serrated surfaces 37 separated by two arcuate smooth surfaces 39. The internal teeth formed by serrated surfaces 37 have the same pitch as the external teeth on rod 18, so that when sleeve 29 is rotated to the position depicted in FIGS. 4–5 the internal teeth on the sleeve mesh with the external teeth on rod 18.

When sleeve 29 is rotated to the position depicted in FIGS. 4–5, the meshed teeth prevent axial movement of rod 18 within sleeve 29. Slots 31 in the sleeve are in a circumferential plane that intersects the axial plane of slot 27 in rod 18, whereby sleeve 29 prevents the rod from movement relative to pivot shaft 24. However, the slots 31 have a slight clearance with the shaft 24 to allow the sleeve 29 to be rotated. Excessive clearance can contribute to lash.

Figure 7:
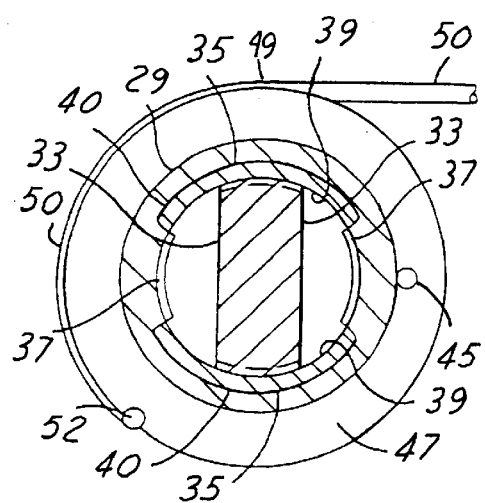
FIG. 7 is a sectional view taken in the same direction as FIG. 5, but with the lock components adjusted to the position of FIG. 6.

When sleeve 29 is rotated to the position depicted in FIGS. 6–7 the internal teeth in sleeve 29 are out of mesh with the external teeth on rod 18. Rod 18 can thereby be moved longitudinally (on rod axis 26) along shaft 24 a limited distance dictated by the length of slot 27. Such movement of the rod can be used to move pivot connection 20 around pivot connection 14, thereby adjusting the tilt angle of column member 12.

Referring back to FIG. 1, pivot connection 20 is shown in three positions, i.e. an intermediate full line position, a limit position 20a wherein rod 18 is advanced upwardly to tilt column member 12 upwardly, and a second limit position 20b wherein rod 18 is retracted downwardly to tilt column member downwardly. Slot 27 limits the rod 18 movement. Rod 18 can have various adjusted positions between limit positions 20a and 20b. The number of discrete rod positions is determined by the pitch distance for the teeth on rod 18 and sleeve 29.

During longitudinal movement of rod 18 within sleeve 29, internal arcuate surfaces 39 on the sleeve act as bearings to maintain the rod in a centered position relative to the sleeve. For manufacturing reasons, each smooth arcuate surface 39 is formed by an arcuate insert member 40 installed within sleeve 29 after the sleeve has been machined to form the diametrically opposed serrated surfaces 37. The exposed arcuate surfaces 39, formed by inserts 40, have a diameter that is the same as the diameter of the arcuate toothed surfaces 35 on rod 18, so that when sleeve 29 is in the position depicted in FIGS. 6–7 the arcuate smooth surfaces will function as bearing surfaces to maintain the sleeve in a centered position on rod 18; i.e. the axis of sleeve 29 is coincident with the rod axis 26. This is beneficial in that the rod can be moved axially within the sleeve without binding or cocking in the sleeve.

Each arcuate insert 40 extends from the right end of sleeve 29 about one half the sleeve length. Inserts 40 are not visible in FIGS. 4 and 6 because the viewing plane for FIG. 4 is beyond the left ends of the inserts. The inserts are of sufficient length to function as bearings for rod 18 when the sleeve is in the FIG. 7 position.

Sleeve 29 is rotated to the position depicted in FIGS. 4 and 5 by a torsion coil spring 42 encircling the sleeve. In some instances locking will occur before the sleeve 29 reaches its extreme angular position shown in FIGS. 4 and 5. As shown in FIGS. 1 and 2, end 43 of the torsion spring is anchored to shaft 24. The other end 45 of the torsion spring extends into a small hole in an externally grooved flange 47 formed on sleeve 29. The torsion coil spring 42 is wound so as to exert a counterclockwise biasing force on sleeve 29, as the sleeve is viewed in FIGS. 5 and 7.

Sleeve 29 is rotated to the position depicted in FIGS. 6 and 7 by a manual cable means, referenced generally by numeral 49 (FIG. 2). The cable means 49 comprises a flexible wire (small diameter cable) 50 having one end anchored at 52 on the grooved flange 47. The flexible wire extends partially around the grooved flange on sleeve 29, and then around an arcuate guide 54 that is suitably attached to the undersurface of column member 10.

As shown in FIG. 1, wire 50 extends rightwardly from arcuate guide 54 to an anchored connection 56 with an arm 57. Arm 57 has a hub portion 58 that is rotatable on a shaft 60 extending laterally from column member 12. The outer end of shaft 60 mounts a manually depressible handle 62.

Manual depression of handle 62 around the shaft 60 axis moves wire 50 in the arrow 61 direction (FIG. 1), such that the wire rotates sleeve 29 in a clockwise direction, as viewed in FIGS. 5 and 7. When handle 62 is manually depressed, sleeve 29 is rotated from the position depicted in FIGS. 4–5 to the position depicted in FIGS. 6–7. When the manual pressure on handle 62 is removed, torsion spring 42 rotates sleeve 29 from the position shown in FIGS. 6–7 to the position shown in FIGS. 4–5.

FIGS. 4–5 depict the extreme normal position of sleeve 29, wherein the external teeth on rod 18 are in mesh with the internal teeth on sleeve 29. The sleeve is locked to rod 18 so that the rod forms a rigid connection between shaft 23 on column member 12 and shaft 24 on column member 10. Column member 12 is thereby retained in a fixed relation to column member 10.

In order to change the tilt setting of column member 12 (up or down around pivot connection 14) handle 62 is manually depressed to rotate sleeve 29 from the position depicted in FIGS. 4–5 to the position depicted in FIGS. 6–7. The internal teeth on sleeve 29 are thereby moved out of mesh with the external teeth on rod 18, as shown in FIG. 7. Column member 12 can then be freely rotated around the axis of pivot connection 14 to any desired tilted position within limits.

When column member 12 is moved around the axis of pivot connection 14, rod 18 slides freely along rod axis 26 to establish a new relation between slot 27 and shaft 24. The effective length of rod 18, between shafts 23 and 24, is changed in accordance with the movement of column member 12. With column member 12 in the new (desired) position, manual pressure on handle 62 is released, such that torsion coil spring 42 returns sleeve 29 to the position depicted in FIGS. 4–5. The internal teeth on sleeve 29 move into mesh with the external teeth on rod 18, such that rod 18 is prevented from longitudinal axial movement along rod axis 26. Sleeve 29 serves as a rigid connector between rod 18 and shaft 24.

One advantage of the present invention locking mechanism is that the internal teeth on sleeve 29 cannot inadvertently disengage from the external teeth on rod 18. As shown in FIG. 5, rod 18 completely fills the vertical space within sleeve 29. The sleeve cannot vibrate in the vertical plane so as to disengage the meshed teeth. In high impact accident situations sleeve 29 will remain in the locked position on rod 18.

A further advantage of the present invention is that in any locked position a relatively large number of teeth are in mesh. Rod 18 has teeth on both its upper surface and its lower surface. Also, the rod and sleeve have large cross-section walls presented to the expected load forces (acting primarily parallel to rod axis 26). This mechanism also provides a high degree of adjustment with many tilt positions. In one embodiment, this design provides thirteen positions of adjustment.

The locking mechanism of the present invention can be constructed as a relatively small size assembly without greatly reducing its strength or ability to handle the expected load forces. As shown in the drawings, the locking mechanism is located externally relative to column members 10 and 12, such that the locking mechanism can be modularized as a separate assembly capable of interchangeable use with a range of different steering columns without extensive tooling changes or structural modifications in the locking mechanism or steering column.

The drawings show rod 18 as having an adjustment slot 27 and sleeve 29 cooperable with shaft 24 on the stationary column member 10. However, the adjustment slot 27 and sleeve 29 could be relocated so as to interact with shaft 23 on movable column member 12.

Figure 8:
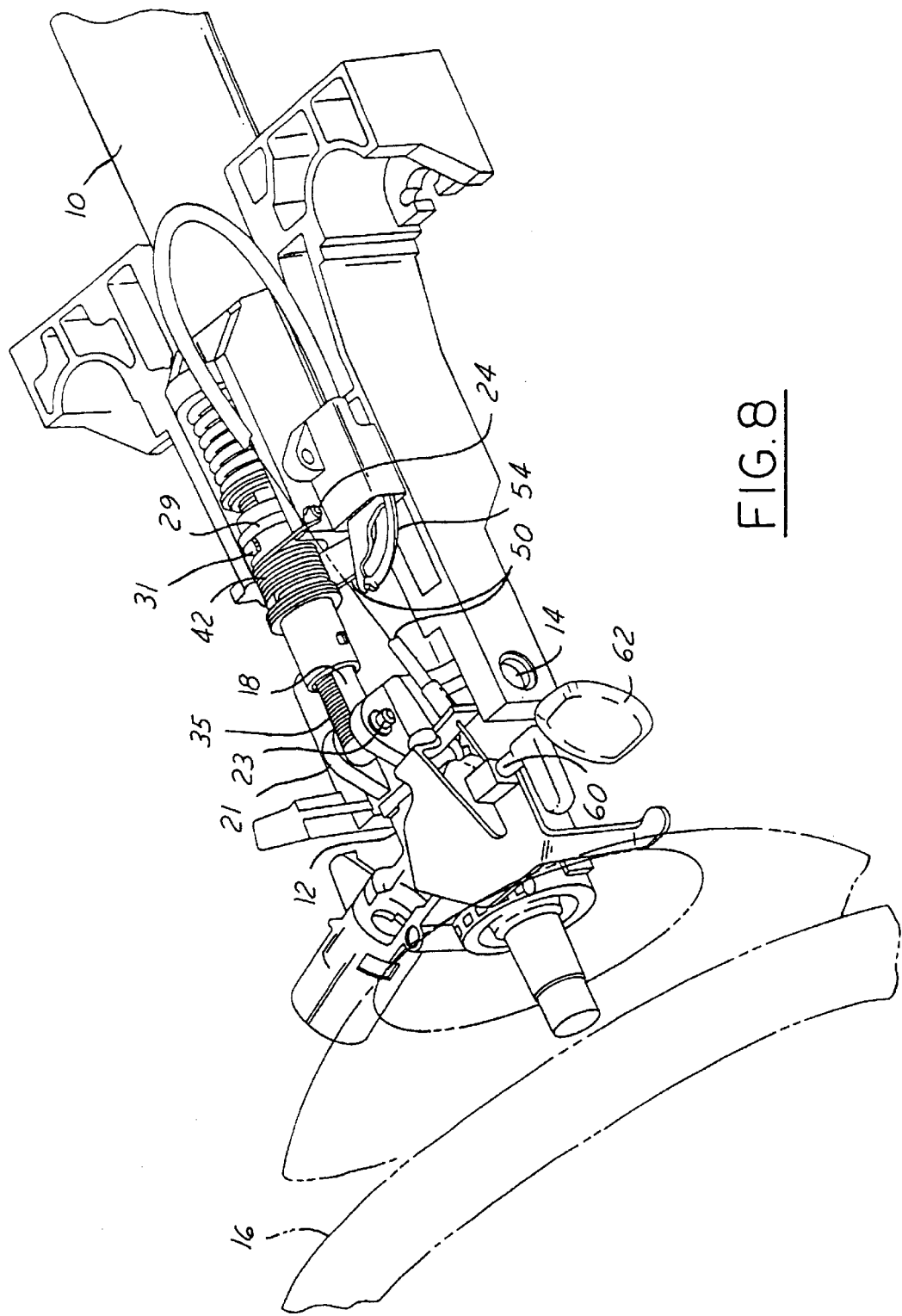
FIG. 8 is a bottom perspective view of an embodiment of a tilt lock vehicle steering column to that shown in FIG. 1.

The tilt lock mechanism of FIG. 8 operates substantially the same as that discussed above.

Figure 9:
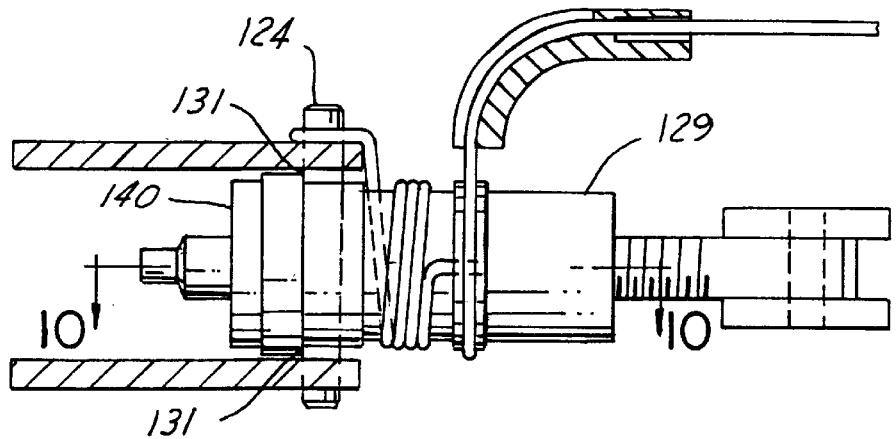
FIG. 9 is a fragmentary sectional view similar to that of FIG. 2 of a preferred embodiment vehicle steering column of the present invention with the added feature of a tolerance cap connected on a sleeve of the steering column locking mechanism.
Figure 10:
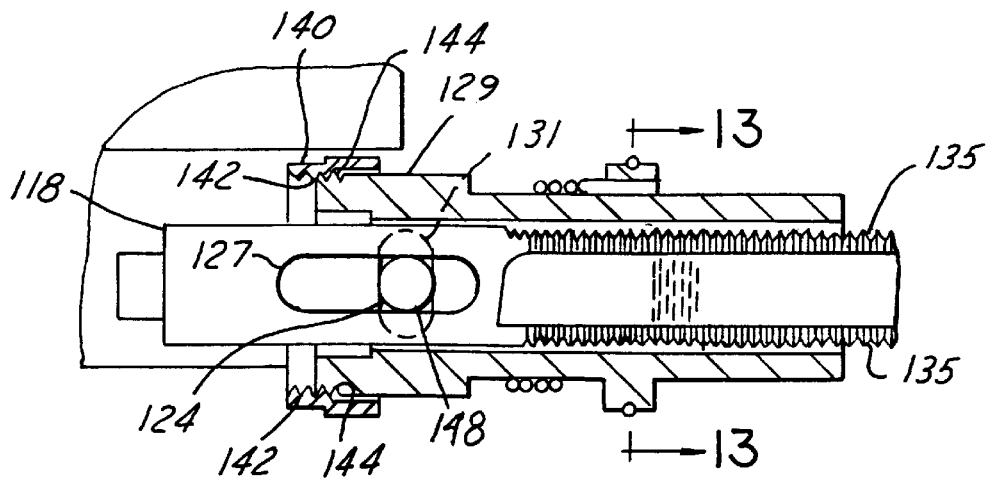
FIG. 10 is a sectional view taken on line 10—10 in FIG. 9 showing a slot of the sleeve on an angle.
Figure 13:
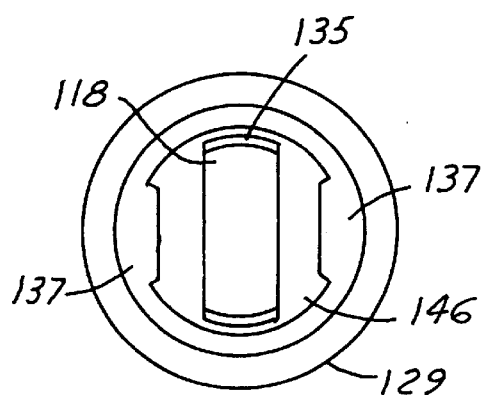
FIG. 13 is a sectional view of FIG. 10 similar to FIG. 7 with the lock components adjusted to an unlocked position.

An embodiment of the present invention is shown in FIG. 9. A feature of the present inventive embodiment is the reduction of lash in the steering column system when the system is locked in place. When the arcuate serrated surfaces 135 of a rod 118, shown in FIG. 10 are meshed with the arcuate serrated surfaces 137 of a sleeve 129, shown in FIG. 13, the system is considered locked. There is no relative movement between rod 118 and sleeve 129.

Referring now to FIG. 10, axial movement (lash) may occur relative to rod 118 and a pivot shaft 124. Pivot shaft 124 is inserted through a circumferential slot 131 in sleeve 129, then through a slot 127 in rod 118, then finally through a second circumferential slot 131 in sleeve 129. Lash occurs as previously mentioned because in order to adjust the tilt of the steering wheel, there must be clearance between the shaft 124 and circumferential slot 131 to allow sleeve 129 to rotate and disengage with rod 118, allowing rod 118 to move longitudinally. When the system is in the unlocked position, lash is not a concern, however, when the system is locked, the possible lash is undesirable. Because of machine tolerances, this problem may arise in the manufacture of slots 131 in sleeve 129.

Figure 11:
FIG. 11 is a partial view of a portion of a slot shown in FIG. 10, showing the shape of the slot in one embodiment of the present invention.

In order to reduce this lash, slots 131, as shown in FIG. 11, are at an angle relative to a line perpendicular to the longitudinal axis of the sleeve 129 and the rod 118, as is shown in FIG. 10. As explained previously, the sides of slot 31 (FIGS. 3, 4 and 6) were perpendicular to the longitudinal axis of the sleeve 29. A tolerance cap 140, shown in FIG. 9, is then affixed to sleeve 129. This is accomplished, referring to FIG. 10, by rotating sleeve 129 until in the locked position relative to rod 118, then screwing tolerance cap 140 onto sleeve 129, whereby the tolerance cap threads 142 are meshed with the sleeve threads 144. Tolerance cap 140 is screwed down onto sleeve 129 until shaft 124 is bound between tolerance cap 140 and on surface 148 of circumferential slots 131. Tolerance cap 140 is then permanently affixed in its position to sleeve 129 by crimping, welding or other appropriate techniques.

The combination of the angled slots 131 and the tolerance cap 140 allows for zero clearance around shaft 124 when the steering column is in the locked position. When the system is unlocked, the clearance between the combination of slots 131 and tolerance cap 140, and the shaft 124, increases as the sleeve 129 rotates. Lash is not a problem because the system is moving in adjustment. Once the system is locked again, the zero clearance position is resumed.

In operation, rod 118 is inserted into an opening 146 (shown in FIG. 13) in sleeve 129. Once rod 118 is fully inserted, pivot shaft 124 is inserted through circumferential slots 131 of sleeve 129, and slot 127 of rod 118. When the steering system is to be locked, sleeve 129 is rotated until the two arcuate serrated surfaces 137 are meshed with the two arcuate surfaces 135 of rod 118. Once in the locked position, tolerance cap 140 is connected to sleeve 129 by screwing tolerance cap 140 onto sleeve 129. Tolerance cap 140 is continuously screwed until it contacts and captures or binds pivot shaft 124 between the tolerance cap 140 and one surface 148 of circumferential slot 131. This creates zero clearance between pivot shaft 124, circumferential slots 131 of sleeve 129, and rod 118. Once the tolerance cap 140 is in place, it is permanently fixed in its position by crimping, welding or other appropriate techniques.

When the sleeve 129 is rotated into the unlocked position, clearance is incrementally increased between pivot shaft 124 and circumferential slots 131, thereby allowing rod 118 to move longitudinally as the steering wheel tilt is adjusted. Once the adjustment is made, the system is then locked wherein sleeve 129 rotates back, causing the clearance to decrease between pivot shaft 124 and circumferential slots 131, until the zero clearance position is reinstated.

Figure 12:
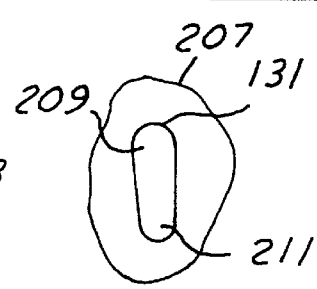
FIG. 12 is a partial view of a portion of FIG. 10, showing an alternative preferred embodiment slot of the present invention wherein the slot of the sleeve is modified from that shown in FIGS. 9–11.

FIG. 12 illustrates another embodiment 207, with slots 131 formed in a teardrop shape. In embodiment 207, slots 131 have a major portion 209 that has a clearance with the pivot shaft 124 and a smaller minor portion 211 that captures the pivot shaft 124 when the rod 118 and sleeve 129 are locked.

While preferred embodiments of the present invention have been disclosed, it is to be understood that they have been disclosed by way of example only and that various modifications can be made without departing from the spirit and scope of the invention as it is encompassed by the following claims.

We claim:

1. An articulated tiltable steering column comprising an upper steering wheel column member, a lower stationary steering column member, and a pivot connection between said upper and lower column members, whereby a steering wheel can be tiltably adjusted around said pivot connection to selected positions of adjustment; and a locking mechanism for retaining said column members in selected positions of adjustment, said locking mechanism comprising an externally threaded rod trained between said column members, and an internally threaded sleeve encircling said rod;

said rod having a longitudinal axis, said rod having a first pivot connecting said rod to one of said column members, and a second pivot connecting said rod to said other column member;

said second pivot comprising a pivot shaft carried by said other column member and an axial slot in said rod slidable on said pivot shaft;

said sleeve having two circumferential slots embracing said pivot shaft;

said rod comprising a first set of circumferentially discontinuous external teeth;

said sleeve comprising a second set of circumferentially discontinuous internal teeth;

said internal teeth being in mesh with said external teeth when said sleeve is rotated in one direction;

said internal teeth being out of mesh with said external teeth when said sleeve is rotated in the opposite direction; and said sleeve having at least one circumferential slot with a major portion and a minor portion, the minor portion being narrower than said major portion, said minor portion capturing said pivot shaft to prevent relative movement of said rod with respect to said pivot shaft when said rod and said sleeve are meshed with one another.

2. The steering column of claim 1, wherein said sleeve has a circumferential slot formed with a first angled side and a tolerance cap having a contact surface to engage said pivot shaft on a side opposite said first angled side.

3. The steering column of claim 2, wherein said tolerance cap is threadably connected to said sleeve.

4. The steering column of claim 2, wherein said circumferential slot is angled between 3–5°.

5. The steering column of claim 4, wherein said circumferential slot is angled 4°.

6. An articulated tiltable steering column comprising an upper steering wheel column member, a lower stationary steering column member, and a pivot connection between said upper and lower column members, whereby a steering wheel can be tiltably adjusted around the pivot connection to selected positions of adjustment; and a locking mechanism for retaining said column members in selected positions of adjustment, said locking mechanism comprising an externally threaded rod trained between the column members, and an internally threaded sleeve encircling said rod;

said rod having a longitudinal axis, said rod having a first pivot connecting the rod to one of the column members, and a second pivot connecting the rod to the other column member;

said second pivot comprising a pivot shaft carried by said other column member and an axial slot in said rod slidable on said pivot shaft;

said sleeve having two circumferential slots encircling said pivot shaft angled between 3–5°;

said rod comprising a first set of circumferentially discontinuous external teeth;

said sleeve comprising a second set of circumferentially discontinuous internal teeth;

said internal teeth being in mesh with said external teeth when said sleeve is rotated in one directions said internal teeth being out of mesh with said external teeth when said sleeve is rotated in the opposite direction; and said sleeve having a tolerance cap threadably connected thereto, said tolerance cap having a contact surface to engage and capture said pivot shaft between itself and said circumferential slot to prevent relative movement of said rod with respect to said pivot shaft when said rod and said sleeve are meshed with one another.

* * * * *